A. VANDERVELD.

ROTARY DISPLAY RACK.

APPLICATION FILED FEB. 8, 1913.

Reissued May 18, 1915.

13,920

3 SHEETS—SHEET 1.

WITNESSES:

J. E. Liverance

L. E. Carrow

INVENTOR.

Anthony Vanderveld.

BY

Frank E. Liverance, Jr.

ATTORNEY.

NORRIS PETERS CO., PHOTO-LITHO., WASHINGTON, D. C.

A. VANDERVELD.

ROTARY DISPLAY RACK.

APPLICATION FILED FEB. 8, 1913.

Reissued May 18, 1915.

13,920.

3 SHEETS—SHEET 2.

WITNESSES:

J. E. Liverance

L. E. Carroll

INVENTOR.

Anthony Vanderveld

BY

Frank E. Liverance, Jr.

ATTORNEY.

THE NORRIS PETERS CO., PHOTO-LITHO., WASHINGTON, D. C.

A. VANDERVELD.

ROTARY DISPLAY RACK.

APPLICATION FILED FEB. 8, 1913.

Reissued May 18, 1915.

13,920.

3 SHEETS—SHEET 3.

WITNESSES:

J. E. Liverance

L. E. Carroll

INVENTOR.

Anthony Vanderveld

BY

Frank E. Liverance, Jr.

ATTORNEY.

THE NORRIS PETERS CO., PHOTO-LITHO., WASHINGTON, D. C.

UNITED STATES PATENT OFFICE.

ANTHONY VANDERVELD, OF GRAND RAPIDS, MICHIGAN, ASSIGNOR TO GRAND RAPIDS SHOW CASE CO., A CORPORATION OF MICHIGAN.

ROTARY DISPLAY-RACK.

13,920. Specification of Reissued Letters Patent. Reissued May 18, 1915.

Original No. 1,004,605, dated October 3, 1911, Serial No. 608,202. Application for reissue filed February 8, 1913. Serial No. 747,210.

*To all whom it may concern:*

Be it known that I, ANTHONY VANDERVELD, a citizen of the United States, residing in the city of Grand Rapids, in the county of Kent and State of Michigan, have invented certain new and useful Improvements in Rotary Display-Racks, of which the following, taken in connection with the accompanying drawings, is a specification, disclosing a full, complete, and operative embodiment of the invention, such as will show to others skilled in the art how to construct and practise the same.

This invention relates to display racks that are inclosed within a case or cabinet, and especially to that type of racks of utility in carrying a large number of hats, caps or other like articles. And it is among the purposes and objects of this invention to make a rack adapted to be inclosed in a case or cabinet which will carry the maximum amount of such articles for a given space, and to support the same movably in the case or cabinet so that any or all of the articles will be freely and conveniently accessible, either for display, placing on the rack or removal therefrom.

Various other new and useful features will appear as the description of the structure progresses.

Figure 1:
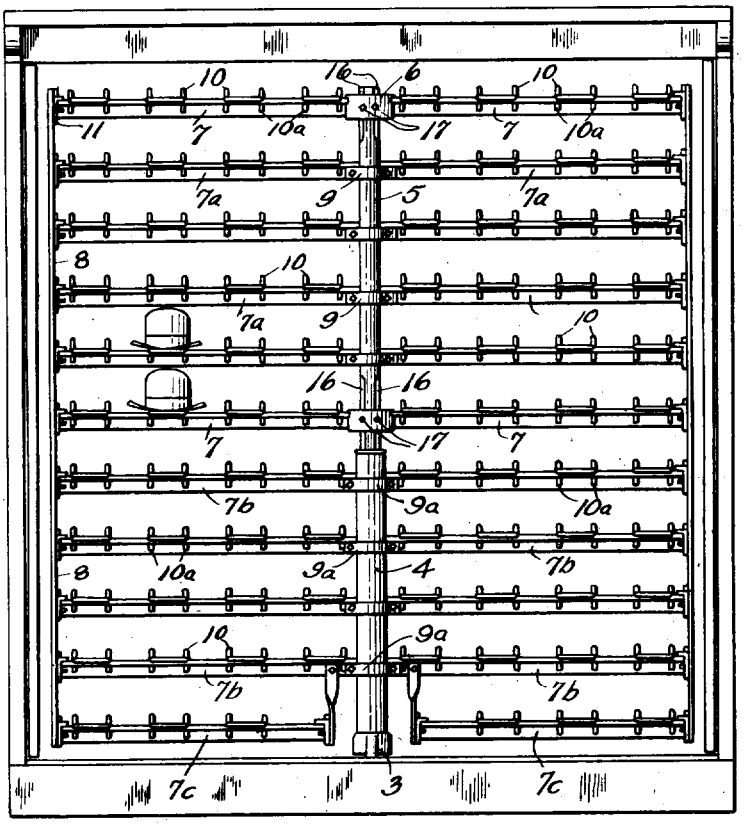
Figure 10:
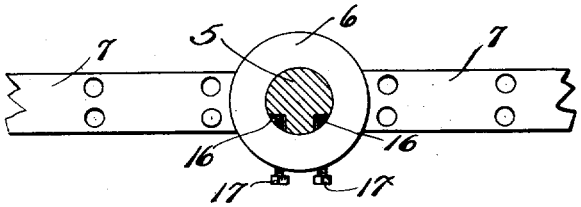
Figure 2:
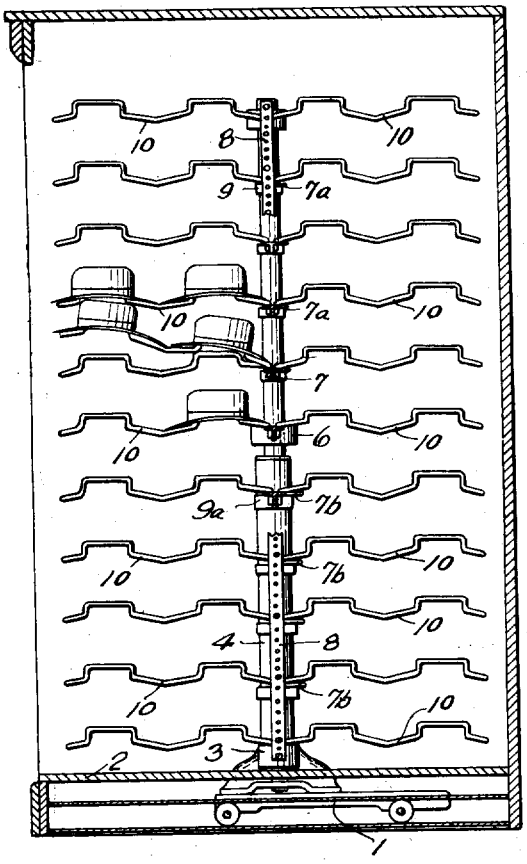
Figure 6:
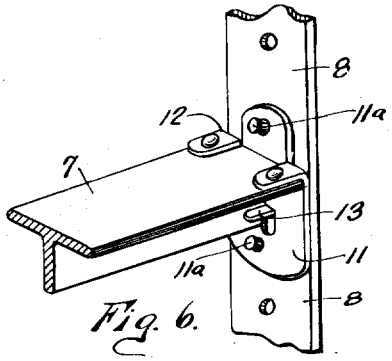
Figure 7:
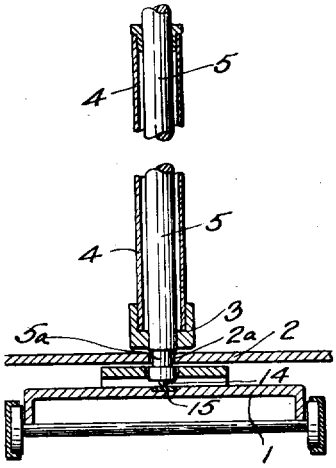
Figure 8:
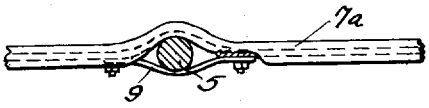
Figure 9:
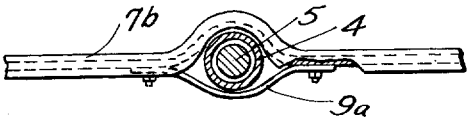
Figure 3:
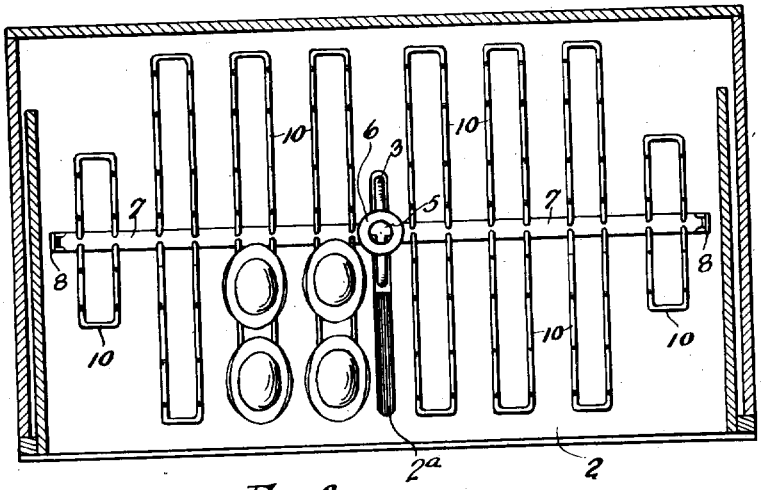
Figure 4:
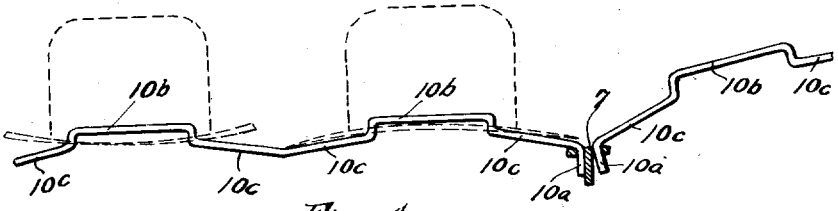
Figure 5:
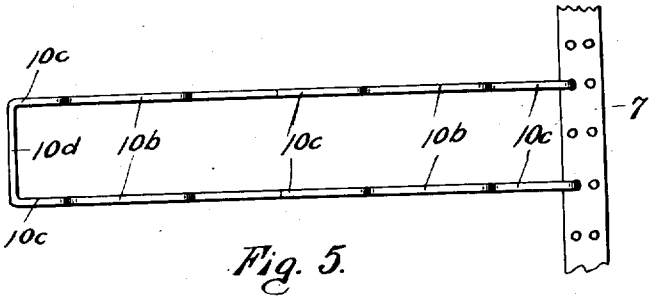

In the drawings, Figure 1 is a front elevation of a device embodying my invention. Fig. 2 is an end elevation of the rack within the case or cabinet, the case being shown in section. Fig. 3 is a plan view of the rack, with the case shown in section to disclose the same. Fig. 4 is a side elevation, enlarged, of one of the hat supports showing its method of support to allow upward pivotal movement thereof. Fig. 5 is a plan view of the hat support shown in Fig. 4. Fig. 6 is an enlarged detail in perspective showing the means for fastening the outer ends of the T-bars to the vertical bars. Fig. 7 is an enlarged vertical section of the carriage and a portion of the column. Fig. 8 is an enlarged detail in plan view of one of the T-bars and its method of securing to the post, said post being shown in section. Fig. 9 is a similar view of the attachment of one of the lower T-bars to the tubular column, said column and the post being shown in section. Fig. 10 is a plan view, with the post shown in section illustrating the adjusting means whereby the rack as a whole is adjusted lengthwise of the post and column.

Similar reference numerals refer to similar parts throughout the several views.

The rack as a whole is mounted to move bodily back and forth in the case or cabinet by means of the carriage 1 mounted on suitable tracks the carriage and tracks being situated beneath the false floor 2, which has a slot $2^a$ therein through which projects a support 3 attached to the carriage, said support having fixed thereto a tubular column 4 which extends upward a distance and in which is mounted a post 5 to which is attached the rack whereby the rack may have rotative movement. The post is reduced somewhat at $5^a$ so as to extend through and traverse the slot $2^a$, and it extends upwardly nearly to the top of the case. On the post are mounted two collars 6, one near the top thereof and the other just above the top of the tubular column 4. Cast into these collars and extending in opposite directions therefrom are the T-bar arms 7 said arms extending nearly to the sides of the case and having attachment at their outer ends to vertically disposed flat bars 8 which extend from the ends of the upper arms 7 nearly to the bottom of the case, parallel to each other and to the post 5. At regular intervals between the arms 7 are positioned horizontally disposed T-bars $7^a$ which extend between the vertical bars 8 and have attachment thereto, being bent at their centers outwardly as shown in Fig. 8 to pass around the post 5, the center lines of the bars being in the plane of the axis of the post. Each bar $7^a$ is secured to the post 5 by a clamp 9 bolted to the vertical web of the T-bar. Below the lower arms 7 are other T-bars $7^b$ which also extend between the vertical bars 8 and have attachment thereto, these bars being centrally bent to pass around the tubular column 4 out of contact therewith as shown in Fig. 9 so that they may turn freely about said column. Each bar $7^b$ has attached thereto at its centrally bent section, a strap $9^a$ which is oppositely bent and extends around the opposite side of the column out of contact therewith, serving to strengthen and stiffen the T-bar. With this construction, there is provided a substantially rigid frame secured to the post 5 and rotatable therewith, the horizontal T-bars 7, $7^a$ and $7^b$ furnishing supporting members to which may be secured the hat supports 10 extending to either side thereof; and at the lower part of the case where the support 3 would interfere with the extension of a bar $7^b$ across from one vertical bar 8 to the other, the bar may have a central section cut away and have the portions $7^c$ left supported one end by a depending strap connected to the lower bar $7^b$, and the other end by the vertical bar 8, said bars $7^c$ also being adapted to support the hat supports 10.

The hat supports 10 are each formed from a single piece of wire, the ends of which are bent to form the portions $10^a$ adapted to enter holes formed in the horizontal webs of the T-bars, thence from each portion $10^a$ extends the upwardly inclined section $10^c$ for a short distance, next coming a horizontal section $10^b$ connected to the section $10^c$ by a vertical portion, and finally a second inclined section $10^c$ connected to the section $10^b$ in like manner. At the ends of the bars the hat supports there mounted include only one pair of horizontal sections $10^b$ and two pairs of inclined sections $10^c$ with the outer sections $10^c$ connected together by a cross piece $10^d$, while the other hat supports nearer the post may each include two of the horizontal sections in line one beyond the other and in pairs with the opposite sections formed from the same wire, there being with each horizontal section $10^b$, two oppositely extending inclined sections $10^c$, the inner hat supports being in effect merely an addition of two of the outer supports, the connecting piece $10^d$ being in both constructions located at the outer ends of the outwardly projecting wires. The raised portions formed by the sections $10^b$ and the vertical connections between them and sections $10^c$ form crown engaging means, the hat being placed on the supports so that these raised portions enter the crown thereof and hold the hat from displacement, while the rim of the hat lies above and clear of the inclined sections $10^c$ so that the hat is not distorted by contact therewith. It is clear that the end supports previously mentioned and described will hold one hat and that the interior supports will hold two.

Hats and like articles vary in depth of crown, and to adjust the supporting bars $7^a$ and $7^b$ to and from each other and the fixed bars 7, the outer ends of all these horizontal T-bars are secured to the vertical bars 8 by means of sheet metal plates 11 secured to the bars 8 opposite the ends of the T-bars and having lugs turned inward at right angles as at 12 riveted to the horizontal members of the T-bars and also having lugs 13 struck up in the lower part embracing the web of the T-bar as shown in Fig. 6. Vertical bars 8 are provided with a series of openings or holes spaced apart in which are inserted screws $11^a$ whereby the plates 11 are adjustably attached to the bars 8 and can be moved to variously space apart the horizontal T-bars, or to add to or take from the rack, T-bars as occasion may require.

The holes which receive the ends $10^a$ of the hat supports 10 are made somewhat larger in diameter than the wires from which the hat supports are made, this allowing each hat support to be upwardly tilted as shown in Fig. 2 affording more room for the insertion and removal of hats on the support next below. It will be apparent that the downwardly projecting ends $10^a$ resting against the vertical web of the T-bar support will permit the hat support units to move downwardly only until the support is substantially horizontal, and as the crown engaging portions of the support extend upwardly into the hat for some distance, in order to get the hat on or off the support there must in some manner be provided sufficient space above the supports to remove the hats. This of course could be secured by spacing the horizontal T-bars far enough apart that there would be space above the hats when placed on the hat supports sufficient to allow their insertion or removal. But such construction is very undesirable as thereby there would be a great amount of waste space of no use whatever except when a hat was being put on or taken off. By making the hat supports 10 tiltable upwardly as described, however, and as shown in Fig. 2, it is evident that the supports can be placed substantially as close together as the height of the hat crowns will allow, and that any hat can be inserted or removed from its support by merely tilting the support next above upwardly, this making sufficient room for the passage of the hat to or from its crown engaging portion on the support. This is a very important feature of my invention, as thereby the maximum amount of hats or like articles can be carried on the rack for a given space, and practically all of the space utilized, while at the same time the hats are held securely on the rack but are freely accessible for removal therefrom and can be easily placed thereon when desired, and in normal position of the hat supports, the hats are presented in proper position for inspection, lying on the horizontally extending hat supports.

As a means to facilitate the rotation of the rack as a whole to present different portions thereof to front position for inspection and access, the lower end of post 5 is provided with a hardened center 14 which rests on a hardened steel plate 15 carried by the carriage 1 whereby little or no friction is produced upon rotation of the rack. The collars 6 heretofore denoted are secured to the post 5 by means of set screws 17 which are spaced apart and engage suitable plane surfaces 16 formed at right angles to the axis of the screws in the side of the post. By turning these screws a slight rotative adjustment of the collars about the post may be accomplished, to bring the T-bars 7 in the two collars in the same vertical plane.

The operation of the device will be clear from the foregoing description. The carriage is moved to the front and the rack may then be rotated to present different portions thereof to the front for access, and hats may be taken off or put on the hat supports by lifting the support next above to afford room for placing the hats on or lifting them off. A greater or less number of T-bars may be used as desired and as required by the height of the hats or like articles, and they may be spaced apart different distances. When use has been made of the rack, it may be returned to inner position within the case by bodily movement thereto, the carriage 1 effecting this movement.

Various modifications in structure may be resorted to and elements equivalent to those set forth may be substituted in the construction without departing from my invention. The disclosure made is to be taken as diagrammatic and illustrative of the invention merely and not as limiting it to any specific structure. I consider myself entitled to all modifications falling within the scope of the appended claims.

What I claim as new and desire to secure by Letters Patent is:—

1. A display rack comprising a plurality of supporting elements located one above the other, a plurality of article supports mounted side by side on said elements, said supports having portions projecting therefrom for engagement with the interior of the crown of a hat or like articles, and means whereby said supports normally extend in substantially a horizontal plane from the supporting elements, but may have upward pivotal movement with relation to said supporting elements, to provide space for the insertion and removal of the articles and for their engagement with and disengagement from the projecting portions of the article supports.

2. A display rack comprising a plurality of supporting elements located one above the other and adjustable toward and from each other, a plurality of article supports pivotally mounted side by side on said elements, means normally causing the article supports to extend from the supporting elements in substantially horizontal planes, and upwardly extending hat interior crown engaging portions having concave formation underneath located on the article supports, with the upwardly extending portion of a hat support located immediately beneath the similar portion of the support next above.

3. A display rack, comprising a rotatable post, horizontally disposed T-bars carried by the post, each having a series of openings near the web and supports consisting of wires bent at the end to enter said openings and laterally engage the web of the bars, and also extending laterally from the T-bars.

4. A display rack, comprising a rotatable post, T-bars extending horizontally from the post and carried thereby, vertically disposed bars attached to the outer ends of the T-bars, intermediate T-bars attached to the vertical bars at their respective ends, and wire supports inserted in openings in the T-bars and extending laterally therefrom.

5. A display rack comprising a rotatable post, collars on the post, oppositely projecting T-bars inserted in the collars, two set screws in one of the collars spaced apart and parallel, said screws also engaging flat surfaces on the post arranged at right angles to the screws, vertical bars attached to the outer ends of the T-bars, other T-bars attached to the vertical bars and bent to engage one side of the post, clamps on the last-named T-bars engaging the other side of the post and supports extending laterally from the T-bars.

6. A display rack comprising a rotatable post, a tubular column in which the lower part of the post is rotative, collars on the post above the column and spaced apart, T-bars extending horizontally and oppositely from the collars, vertically disposed bars attached to the outer ends of the T-bars and extending downward opposite the column, other T-bars attached at intervals to the vertical bars, those extending across the post being bent to engage one side thereof and clamped thereto, and those extending across the column being bent opposite the same and out of contact therewith, and supports mounted on the T-bars and extending laterally therefrom.

7. A display rack comprising a horizontally disposed series of superposed T-bars spaced apart and each having openings therein close to the vertical web, and wire supports of less diameter than the openings bent downward at the ends to enter said openings and laterally engage the web of the bar to hold the support horizontally extended from the bar and also to permit the support to be lifted at its free end.

8. In a display rack, a T-bar having openings near the web, and a wire hat support having its ends bent downward and inserted in said openings and laterally engaging the web of the bar and also having side portions bent upward to form raised portions to enter the crown of a hat and hold the same in place on the support.

9. In a display rack, a horizontally disposed T-bar, a vertically disposed flat bar, a plate secured to the flat bar and having lugs bent at right angles and riveted to the head of the T-bar and also having other lugs struck up at each side of the web of the T-bar.

10. A display rack, comprising a rotatable post, oppositely projecting horizontal T-bars carried by the post, vertically disposed flat bars attached to the outer ends of the T-bars and having openings at intervals, other T-bars extending between the vertical bars, plates attached to the ends of the last named T-bars and fastenings to secure the plates to the vertical bars adjustable in said openings.

11. A display rack, comprising a horizontally disposed series of superposed bars, and adjustable to vary the vertical distance between them, a plurality of openings in said bars, wire hat supports mounted side by side on each bar and having ends inserted in the openings of the bars and also having raised portions to enter the crown of a hat and hold the same on the support, and means whereby said hat supports are normally retained in substantially horizontal position on the bars but are permitted pivotal movement in a vertical plane to and from such position.

12. In a display rack, a horizontally disposed series of bars, a plurality of hat supports each having raised portions to enter the crown of a hat a limited distance mounted on the bars and extending normally in substantially horizontal planes to either side thereof, and means permitting said hat supports to have pivotal movement in vertical planes to and from said normal positions whereby movement of a single hat support in a vertical direction will allow the putting on or taking off of the hat from the support immediately beneath.

In testimony whereof, I have hereunto affixed my signature in the presence of two witnesses.

ANTHONY VANDERVELD.

Witnesses:
S. H. Young,
Frank E. Liverance, Jr.

Copies of this patent may be obtained for five cents each, by addressing the "Commissioner of Patents, Washington, D. C."